(12) United States Patent
Hasselgren

(10) Patent No.: US 10,089,964 B2
(45) Date of Patent: Oct. 2, 2018

(54) GRAPHICS PROCESSOR LOGIC FOR ENCODING INCREASING OR DECREASING VALUES

(71) Applicant: INTEL CORPORATION, Santa Clara, CA (US)

(72) Inventor: Jon N. Hasselgren, Bunkeflostrand (SE)

(73) Assignee: INTEL CORPORATION, Santa Clara, CA (US)

( * ) Notice: Subject to any disclaimer, the term of this patent is extended or adjusted under 35 U.S.C. 154(b) by 154 days.

(21) Appl. No.: 14/975,400

(22) Filed: Dec. 18, 2015

(65) Prior Publication Data

US 2017/0178597 A1 Jun. 22, 2017

(51) Int. Cl.
| G09G 5/36 | (2006.01) |
| G06T 7/00 | (2017.01) |
| G06T 11/40 | (2006.01) |
| G06T 15/00 | (2011.01) |
| G09G 5/14 | (2006.01) |
| G09G 5/397 | (2006.01) |
| G06T 9/00 | (2006.01) |

(52) U.S. Cl.
CPC ........... *G09G 5/363* (2013.01); *G06T 7/0051* (2013.01); *G06T 9/00* (2013.01); *G06T 11/40* (2013.01); *G06T 15/005* (2013.01); *G09G 5/14* (2013.01); *G09G 5/397* (2013.01); *G06T 2207/20172* (2013.01); *G09G 2360/08* (2013.01); *G09G 2360/121* (2013.01)

(58) Field of Classification Search
None
See application file for complete search history.

(56) References Cited

U.S. PATENT DOCUMENTS

| 2004/0207642 A1* | 10/2004 | Crisu | G06T 11/203 345/626 |
| 2005/0157204 A1* | 7/2005 | Marks | H04N 5/2226 348/370 |
| 2005/0180652 A1* | 8/2005 | Zhu | H04N 5/142 382/261 |
| 2009/0046935 A1* | 2/2009 | Akenine-Moller | G06T 9/00 382/235 |
| 2010/0073709 A1 | 3/2010 | Jones et al. | |

(Continued)

FOREIGN PATENT DOCUMENTS

JP 2011227933 A 11/2011

OTHER PUBLICATIONS

Iternational Searching Authority at the Korean Intellectual Property Office, International Search Report and Written Opinion for International Patent Application No. PCT/US2016/055569, dated Jan. 25, 2017, 15 pages.

*Primary Examiner* — Yu Chen
(74) *Attorney, Agent, or Firm* — Womble Bond Dickinson (US) LLP

(57) ABSTRACT

Embodiments provide for a graphics processing apparatus comprising a graphics processing unit including bounding volume logic to encode a first bounding volume and a second bounding volume for a bounding volume hierarchy, wherein the first bounding volume is to be encoded at a higher numerical precision relative to the second bounding volume and the first bounding volume encloses the second bounding volume.

15 Claims, 18 Drawing Sheets

(56) References Cited

U.S. PATENT DOCUMENTS

2012/0287139 A1\* 11/2012 Wyatt .................... G09G 3/003
  345/520
2013/0328873 A1   12/2013 Harada et al.
2014/0035939 A1\*  2/2014 Schneider ............. G09G 5/363
  345/545

\* cited by examiner

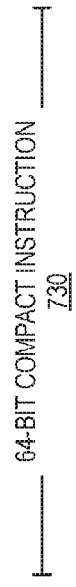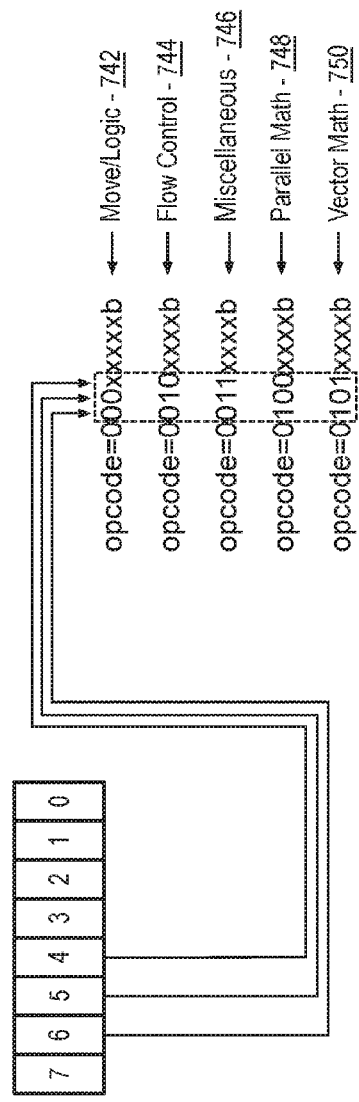
FIG. 7

GRAPHICS PROCESSOR LOGIC FOR ENCODING INCREASING OR DECREASING VALUES

TECHNICAL FIELD

Embodiments generally relate to graphics processing logic. More particularly, embodiments relate to graphics processing logic for the encoding of pixel data or metadata.

BACKGROUND

Graphics processors can include logic that is specially designed for encoding pixel data or metadata in a more compact form to reduce memory storage and transmission bandwidth and/or to improve pixel processing performance. Several parts of the rasterization pipeline, such as hierarchical depth culling, color compression, stencil compression, and depth compression store per-sample coverage masks in memory. Additionally, when using multi-sampling anti-aliasing (MSAA), the number of samples can grow rapidly and many algorithms used by graphics processor that rely on storing per-sample coverage masks scale poorly with sample rate.

BRIEF DESCRIPTION OF THE DRAWINGS

The various advantages of the embodiments will become apparent to one skilled in the art by reading the following specification and appended claims, and by referencing the following drawings, in which:

FIG. 7 illustrates a graphics processor execution unit instruction format according to an embodiment;

DESCRIPTION OF EMBODIMENTS

Figure 1:
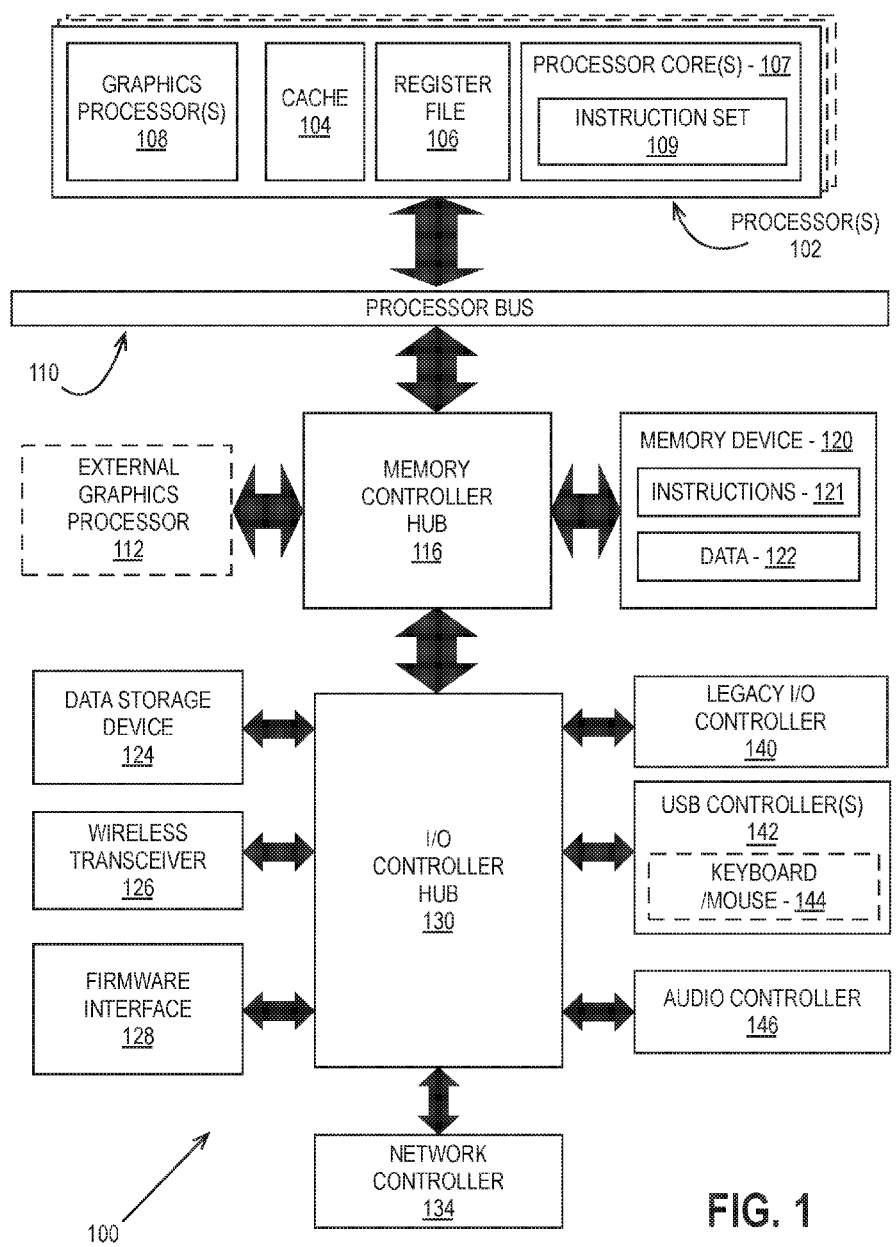
FIG. 1 is a block diagram of an embodiment of a computer system with a processor having one or more processor cores and graphics processors.

Embodiments described herein leverage assumptions that may be made about the configuration of pixel data and metadata to reduce the amount of storage required to encode pixel data and metadata within the graphic processor during graphic processor operations. For example, to perform hierarchical depth testing on pixel data, edges or "break points" can be encoded for each scan line within a group of pixels. Existing implementations of a graphics processor may encode such breakpoints as binary values. For N possible values along M scanlines, $M \times \lceil \log_2 N \rceil$ bits may be used to store the breakpoints.

Embodiments described herein provide for graphics processor logic that optimizes (e.g., reduce) the number of bits used to encode breakpoints by assuming the values will be increasing or decreasing during a scan through pixel data within a pixel tile. Given a sequence of pixel data or metadata values $b_i$, in some rendering scenarios it can be assumed that $\{b_i \le b_{i+1} | \forall i\}$ or $\{b_i \ge b_{i+1} | \forall i\}$. In general, this assumption holds for most cases that are subject to break point encoding and can be safely made for cases in which a single edge crosses a tiled group of pixels. Using the assumption of increasing or decreasing values, a more efficient encoding system can be devices that uses fewer bits relative to the $M \times \lceil \log_2 N \rceil$ bits of straightforward binary encoding.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-19 provide specific details of the various embodiments. Although some of the following embodiments are described with reference to a graphics processor, similar techniques and teachings can be applied to other types of circuits or semiconductor devices, as the teachings are applicable to any processor or machine that manipulates or processes image data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while the I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
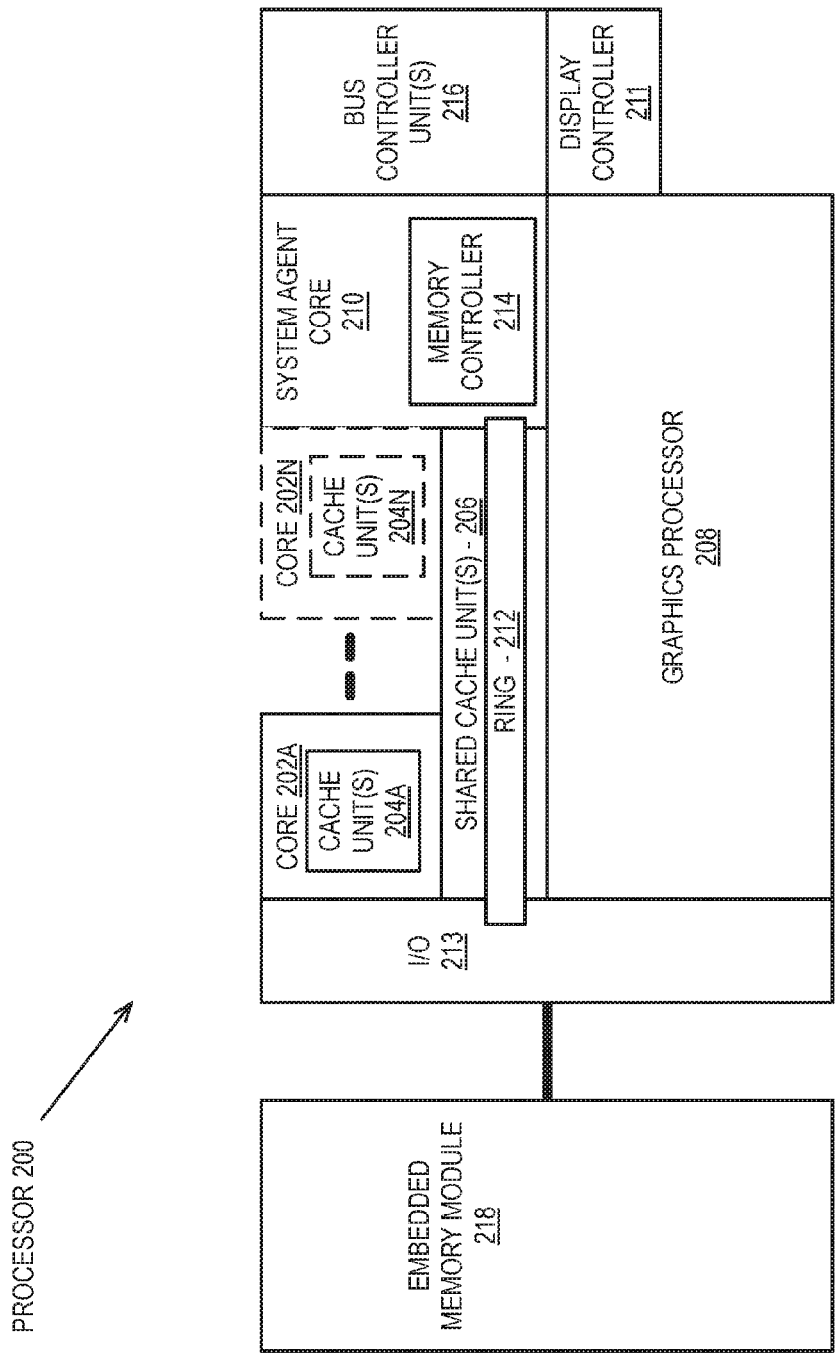
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
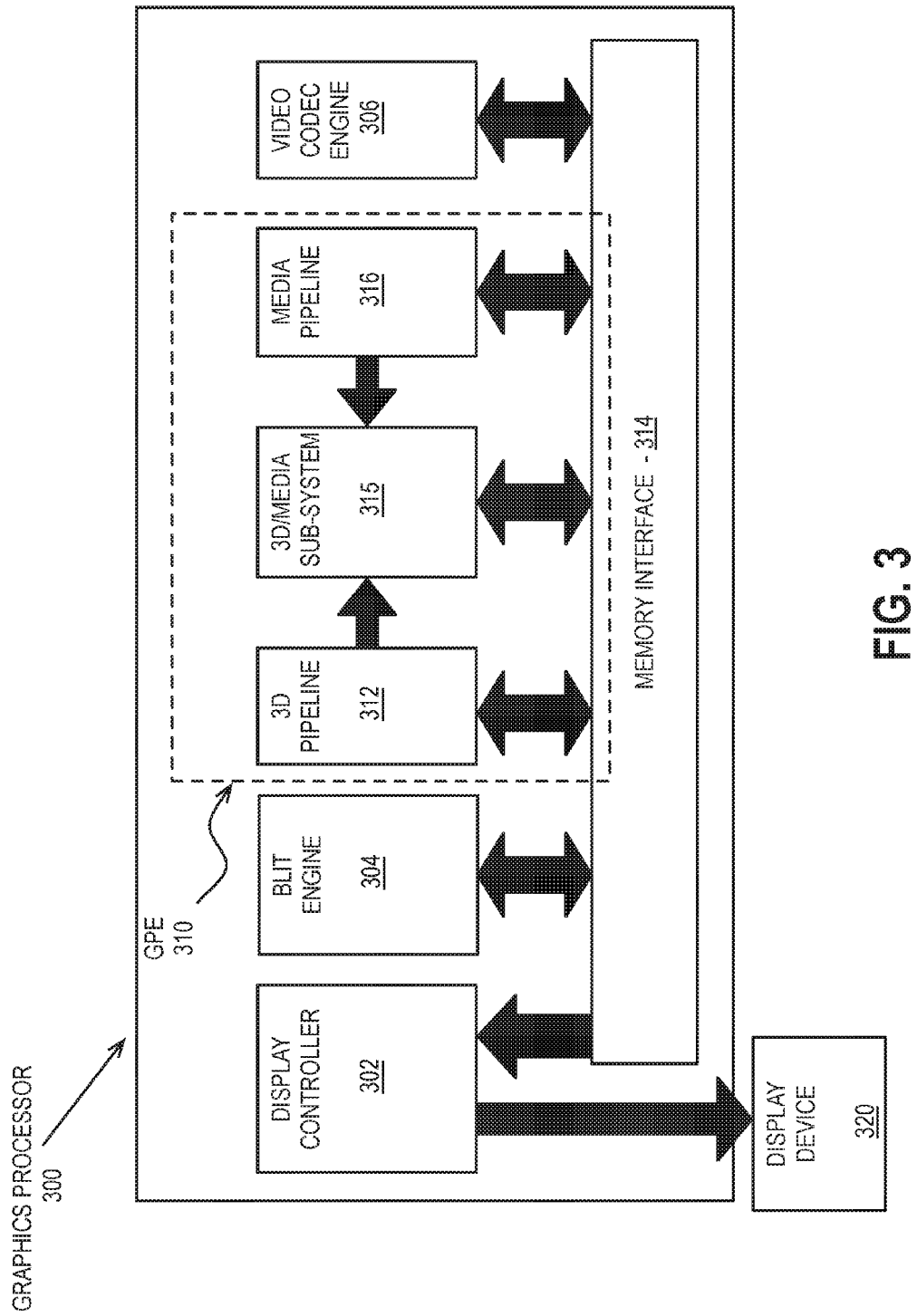
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
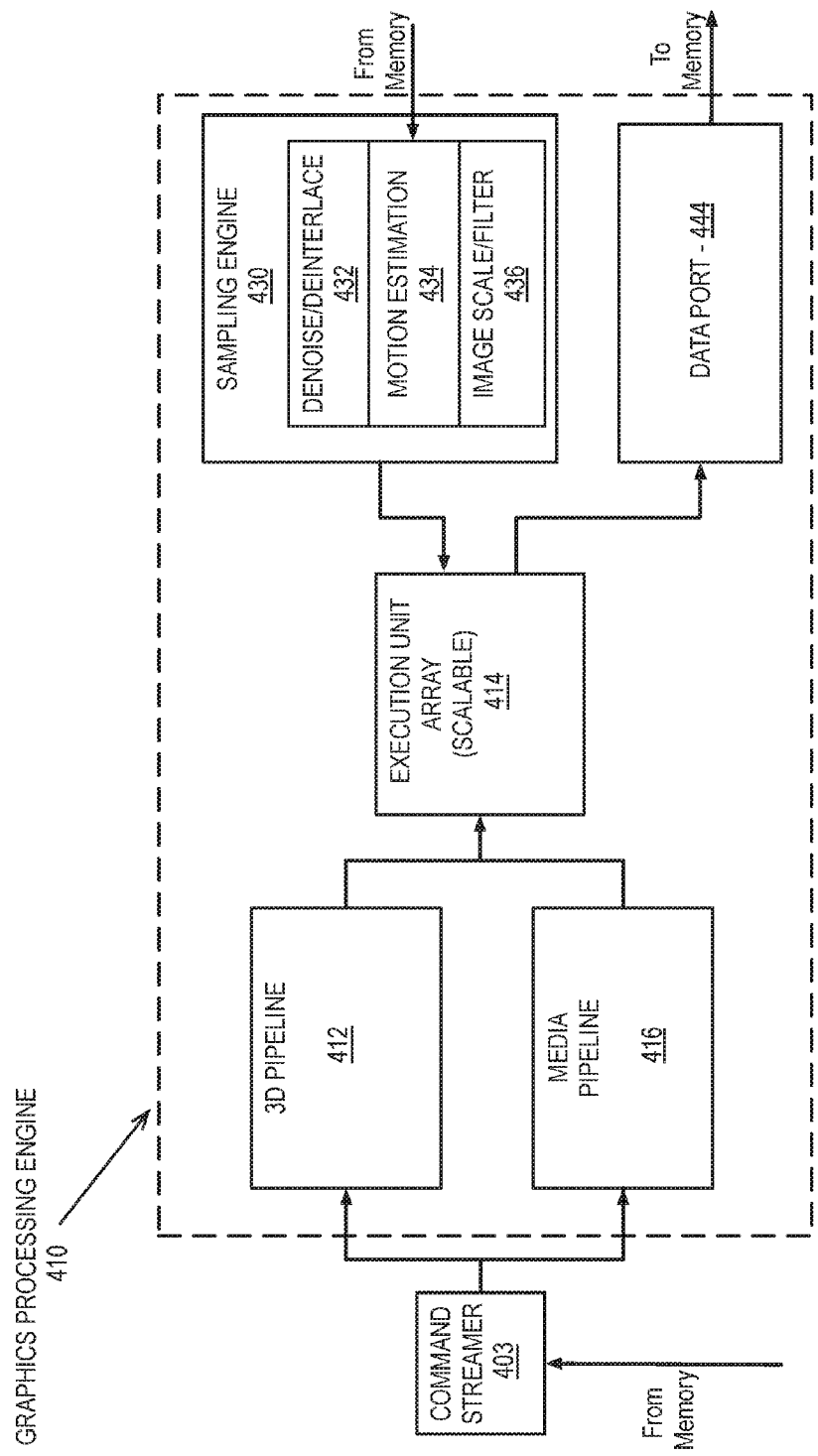
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
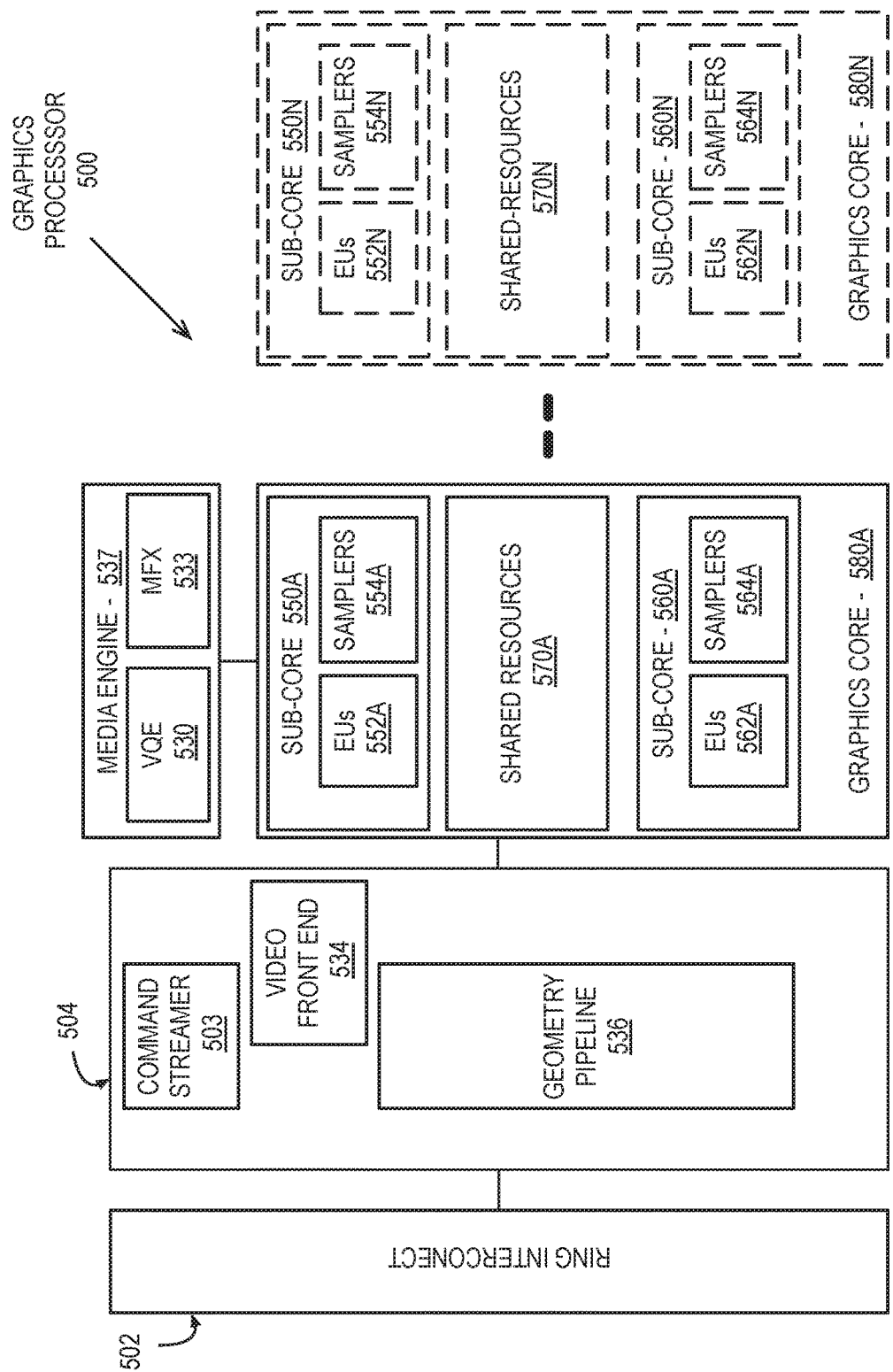
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
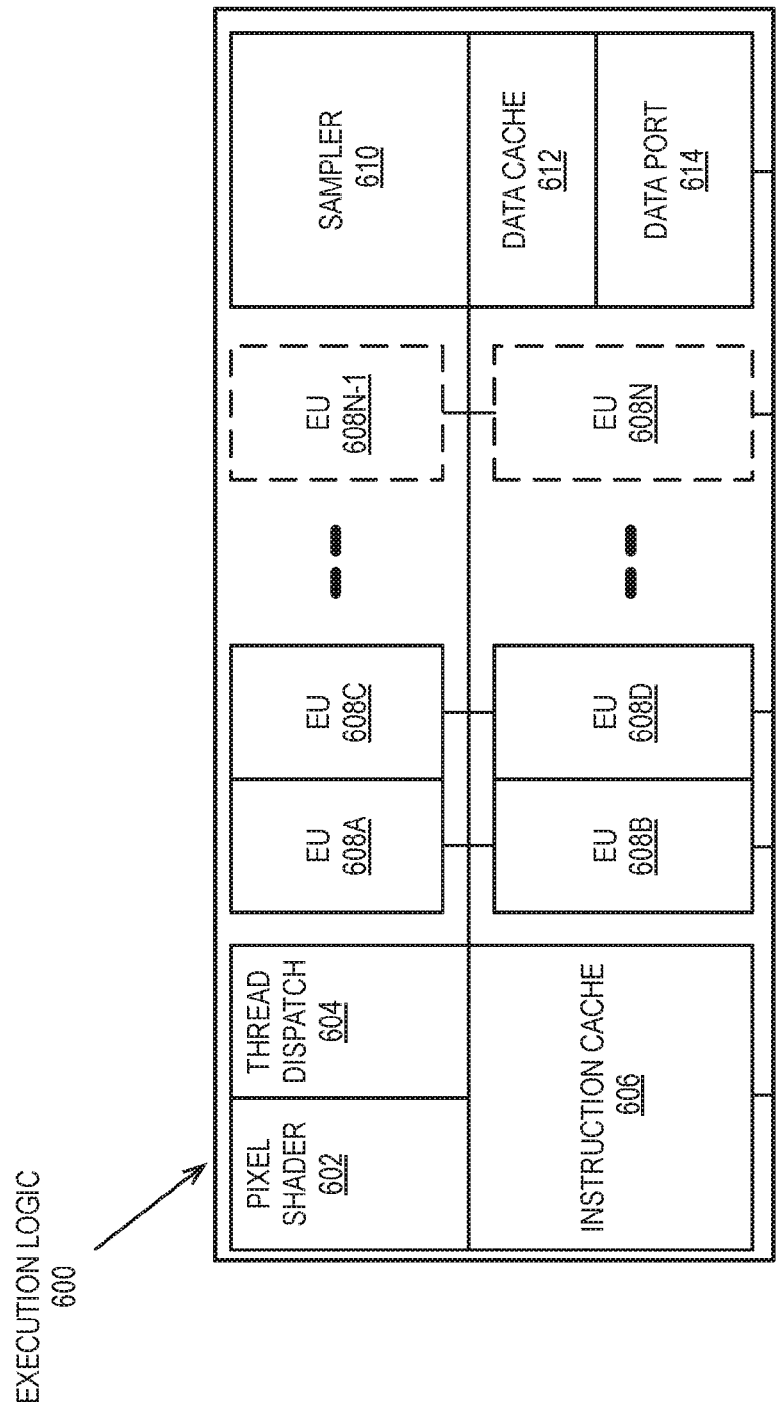
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
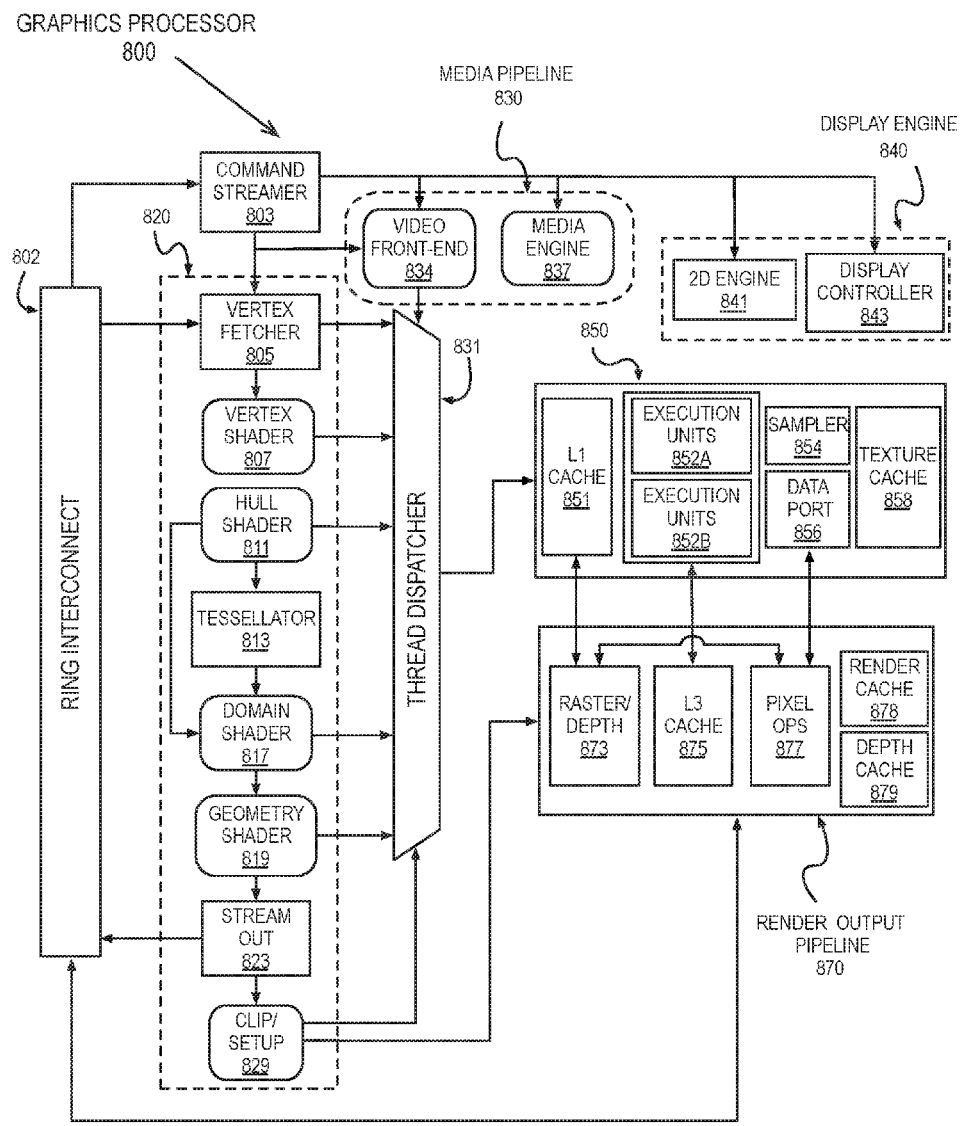
FIG. 8 is a block diagram of another embodiment of a graphics processor which includes a graphics pipeline, a media pipeline, a display engine, thread execution logic, and a render output pipeline.
Figure 9:
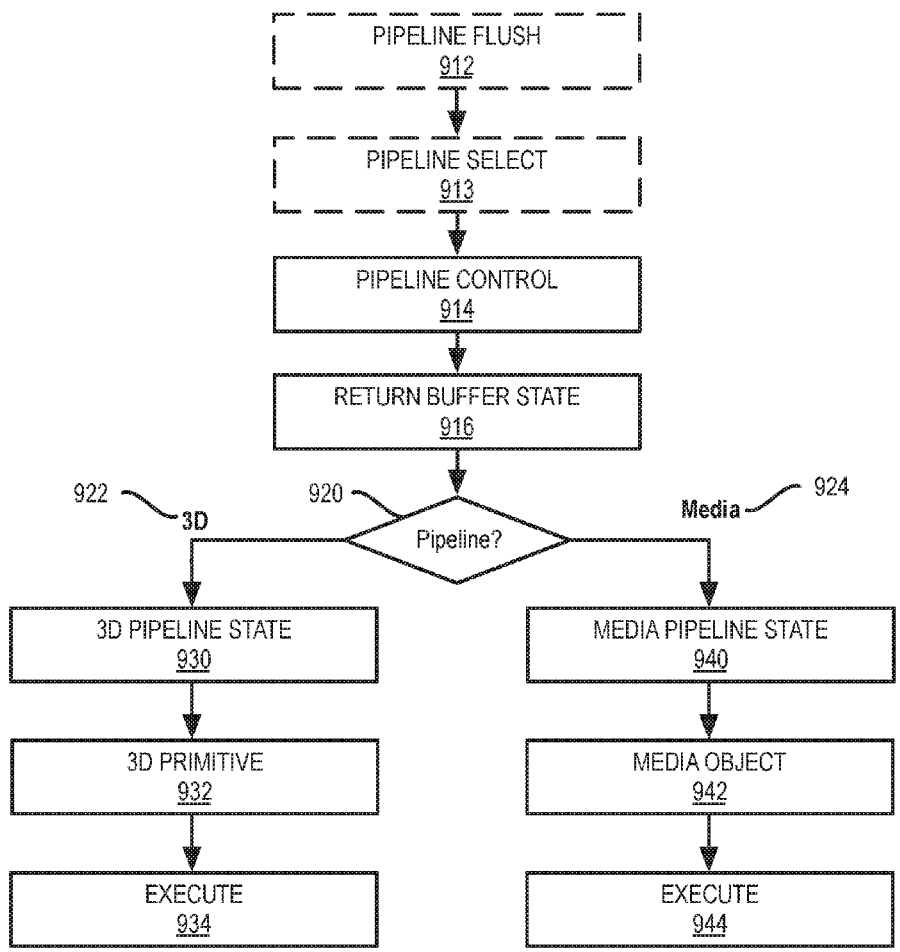
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
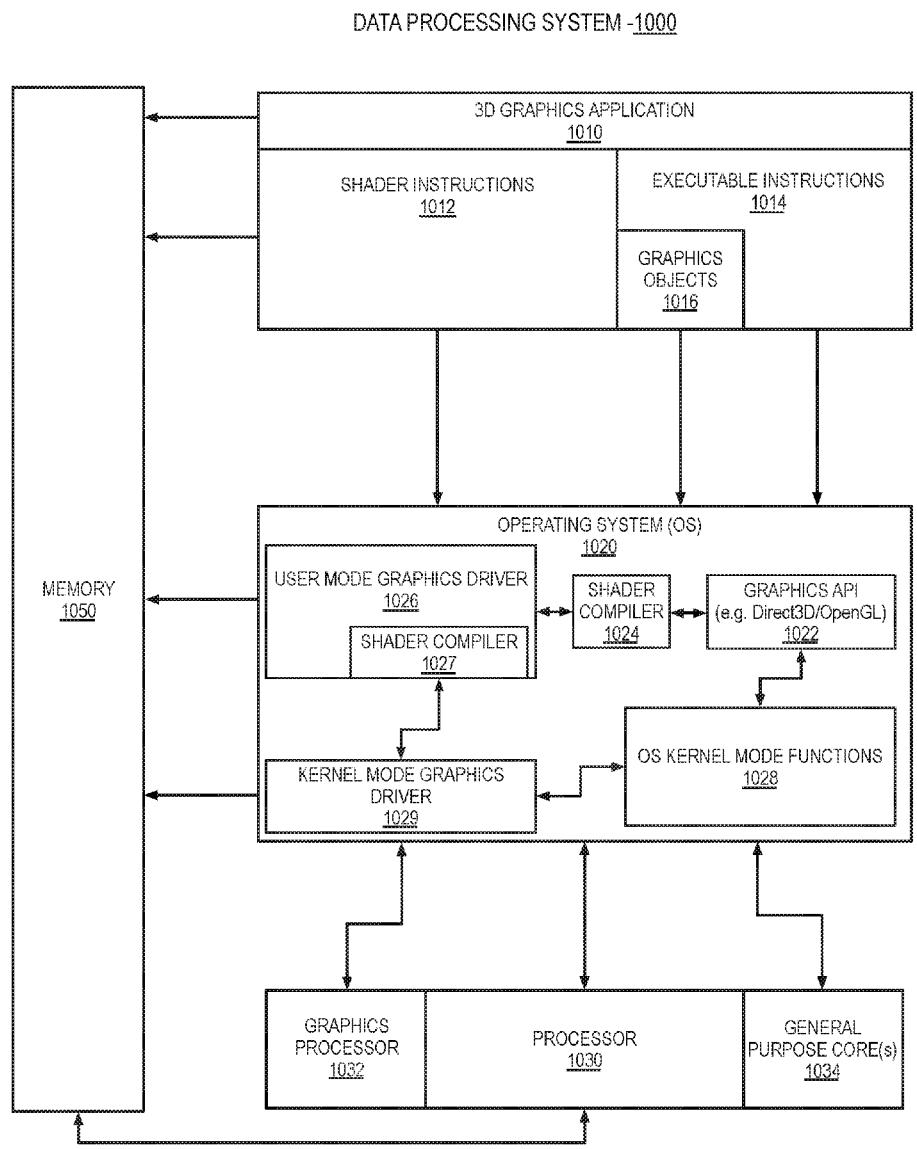
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
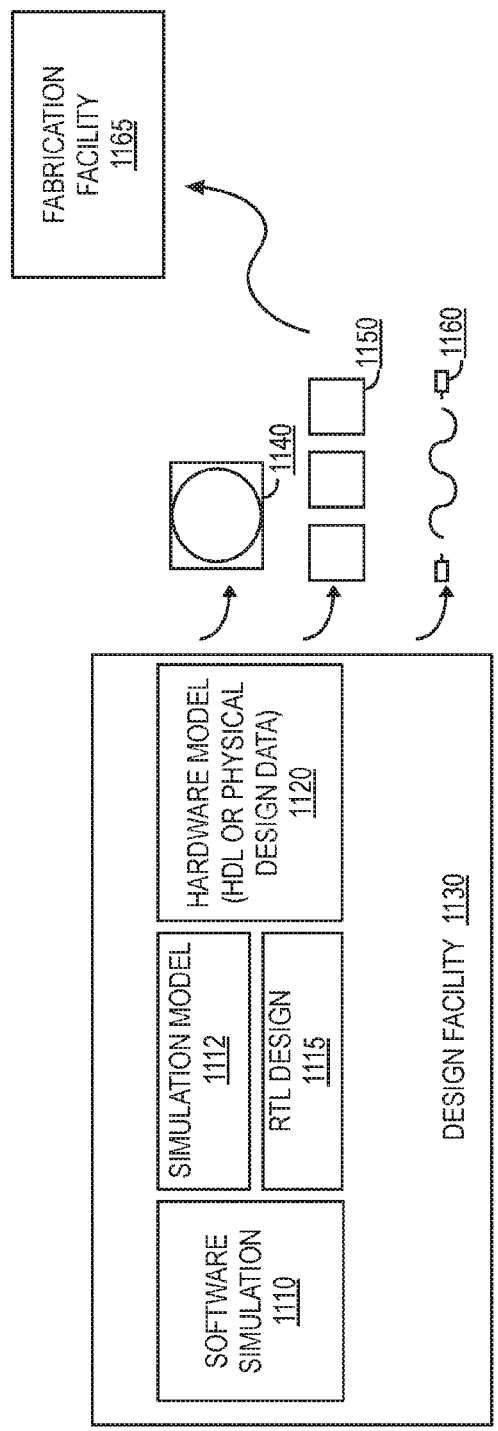
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
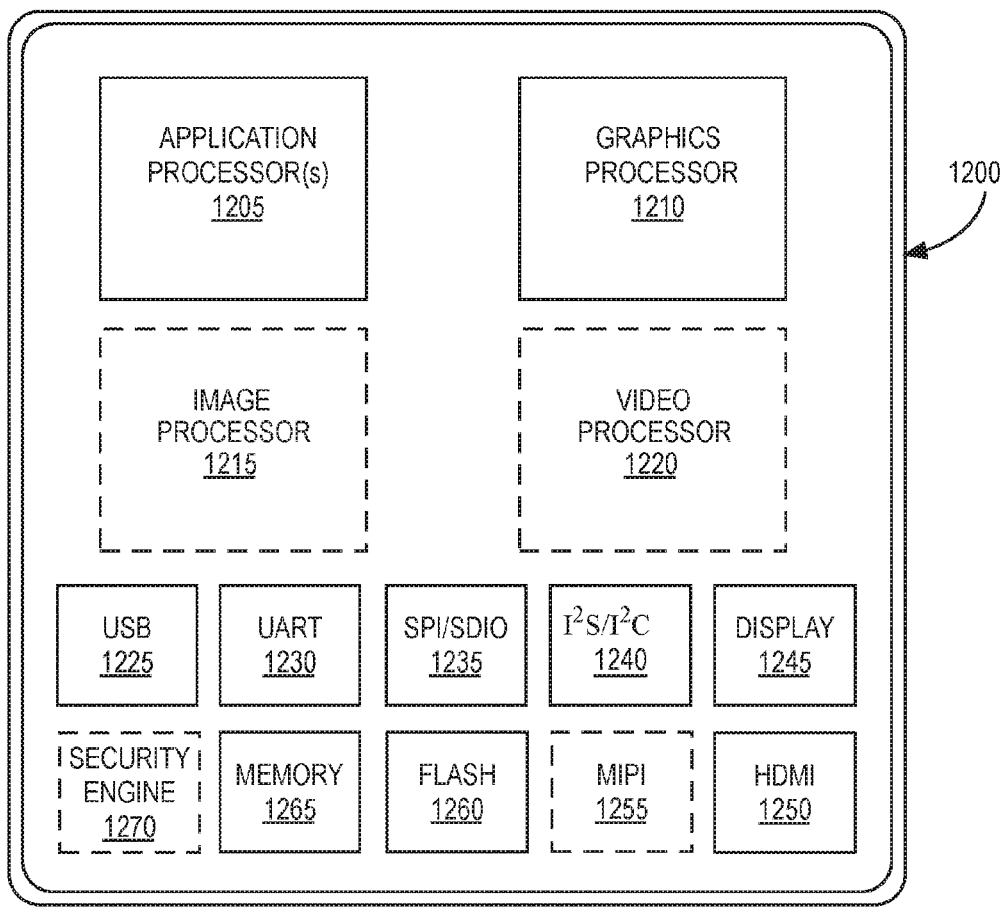
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Graphics Processor Logic for Encoding Increasing or Decreasing Values

Graphics processor logic for encoding increasing or decreasing values is described below. The logic for the encoding of the increasing or decreasing values has several applications in pixel data or metadata processing. The encoding of breakpoints during hierarchical depth testing will be used as an exemplary application, however, such logic may be applied in other graphics processing contexts where encoded data is known to be increasing or decreasing.

Culling is a graphics operation in which graphics processing efforts that do not alter the final image are removed or avoided. This includes, for example, view frustum culling, where objects that are outside the view frustum are not further processed, since they will not affect the final image. In the example of hierarchical depth testing (e.g., hierarchical Z, hierarchical occlusion culling, etc.) a maximum depth of a tile (e.g., group) of pixels is stored and maintained per tile of pixels. If the estimated conservative minimum depth of a geometric object (e.g., triangle primitive) inside a tile is greater than the tile's maximum depth, then the triangle is completely occluded. In this case, the read of the per-pixel or per-sample depth values from memory can be avoided and further processing can be skipped for the tile for the triangle. In addition, a minimum depth of the depths within a tile can also be stored to avoid depth reads if a triangle fully covers a tile and the triangle's estimated conservative maximum depth is smaller than the minimum depth, in which case the triangle will overwrite all depths in the tile, assuming alpha and stencil test is disabled.

Figure 13:
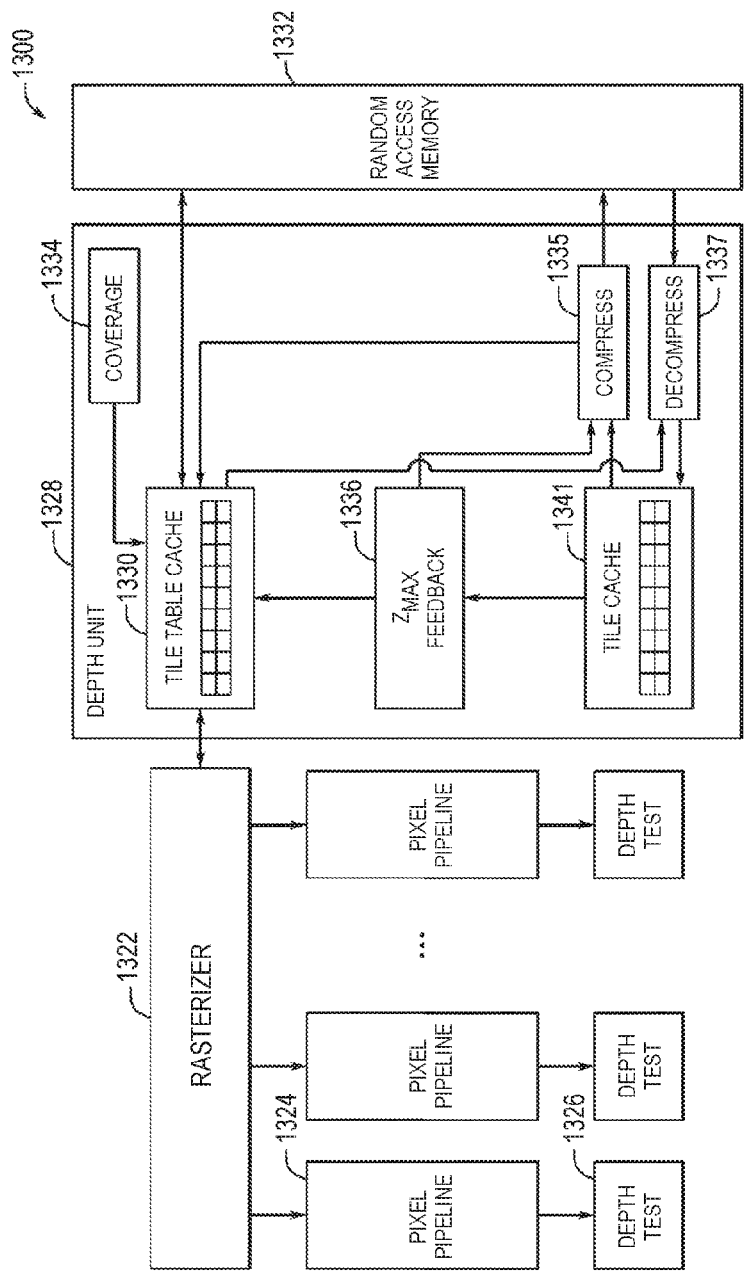
FIG. 13 is an illustration of a bounding volume, according to embodiments.

FIG. 13 is a block diagram of exemplary rasterization architecture 1300 in which graphics processor logic for encoding increasing or decreasing values may be implemented. The exemplary rasterization architecture 1300 includes a rasterizer 1322 to identify pixels that lie within a triangle primitive during a render operation. To maximize memory coherency for the architecture, it may be beneficial to identify which tiles or groups of pixels overlap the triangle. When the rasterizer finds a tile that partially overlaps the triangle, the rasterizer can distribute the pixels in that tile over a number of pixel pipelines 1324. The purpose of each pixel pipeline is to compute the depth and color of a pixel. Each pixel pipeline contains a depth test unit 1326 that is responsible for discarding pixels that are occluded by the previously drawn geometry. The depth unit 1328 includes a memory, which in one embodiment is a random access memory 1332. The depth unit also includes a tile table cache 1330 that temporarily stores a representation of a maximum depth mask (e.g., $z_{MAX}$) for each tile. The tile table cache is backed by the memory (e.g., random access memory 1332) and a tile cache 1341. In one embodiment the tile cache 1341 is also backed by the memory and temporarily stores per-sample depth values for rapid access. The depth unit 1328 optionally provides a $z_{max}$ feedback computation 1336 that updates the $z_{max}$ representation in the tile table 1330 each time a tile is evicted from the tile cache 1341. The depth unit 1328 additionally includes a compressor 1335, a decompressor 1337, and a coverage mask buffer 1334. The tile table cache 1330 stores the $z_{max}$ representation and header information, for example one or more flags identifying a compression algorithm that is used to compress a tile of depth values separately from other depth buffer data.

The compressor 1335, in general, compresses the tile depth values to a fixed bit rate and fails if it cannot represent the tile in a given number of bits without information loss. When writing a depth tile to memory, one or more compression algorithms may be used by the compressor and the algorithm that attains the lowest bit rate without excessive information lost is typically selected. The flags in the tile table are updated with an identifier that is unique to the compression algorithm that is used and the compressed data is written to memory. In one embodiment, multiple compressors may be used, each configure with a different compression algorithm. In such embodiment, the flags in the tile table are updated with an identifier that is unique to the compressor used to perform the compression. When a tile is read from memory, the compressor or compressor algorithm identifier can be read from the tile table and the data is decompressed using the corresponding decompressor 1337 or decompressor algorithm.

While an exemplary rasterization architecture 1300 is illustrated and described, embodiments are also applicable to non-rasterization rendering techniques, such as ray tracing or hybrid rasterization.

Break Points and Break Regions

In one embodiment, two or more maximum depth values can be maintained per tile. In the example of two layers, each tile stores two maximum depth values and the maximum depth mask can store a single bit indicating whether a sample uses the maximum depth value from layer one or the maximum depth value from layer two. The point at which a transition occurs between layers can be referred to as a break region. Depth information for the break region can be separately encoded, as the break region may contain per-sample depth information. For example, a per-sample mask for the region can be stored to indicate which layer is associated with each sample. A break point can be defined as the beginning of the break region.

In addition to depth values, break regions and breakpoint encoding may be relevant in coverage masking. When a triangle is rasterized inside a tile, a coverage mask is generated. In one embodiment the coverage mask has one bit per sample in the tile. Each bit is set to one if the sample is covered by the triangle and does not unambiguously fail the conservative depth test in the depth-culling unit. In some instances it may be possible to compress the per-sample coverage mask using a compressed bit-mask representation. In the instance of depth layer and coverage masks, break point or break region encoding can be optimized by assuming the data set is contains only increasing or decreasing values.

Figure 14:
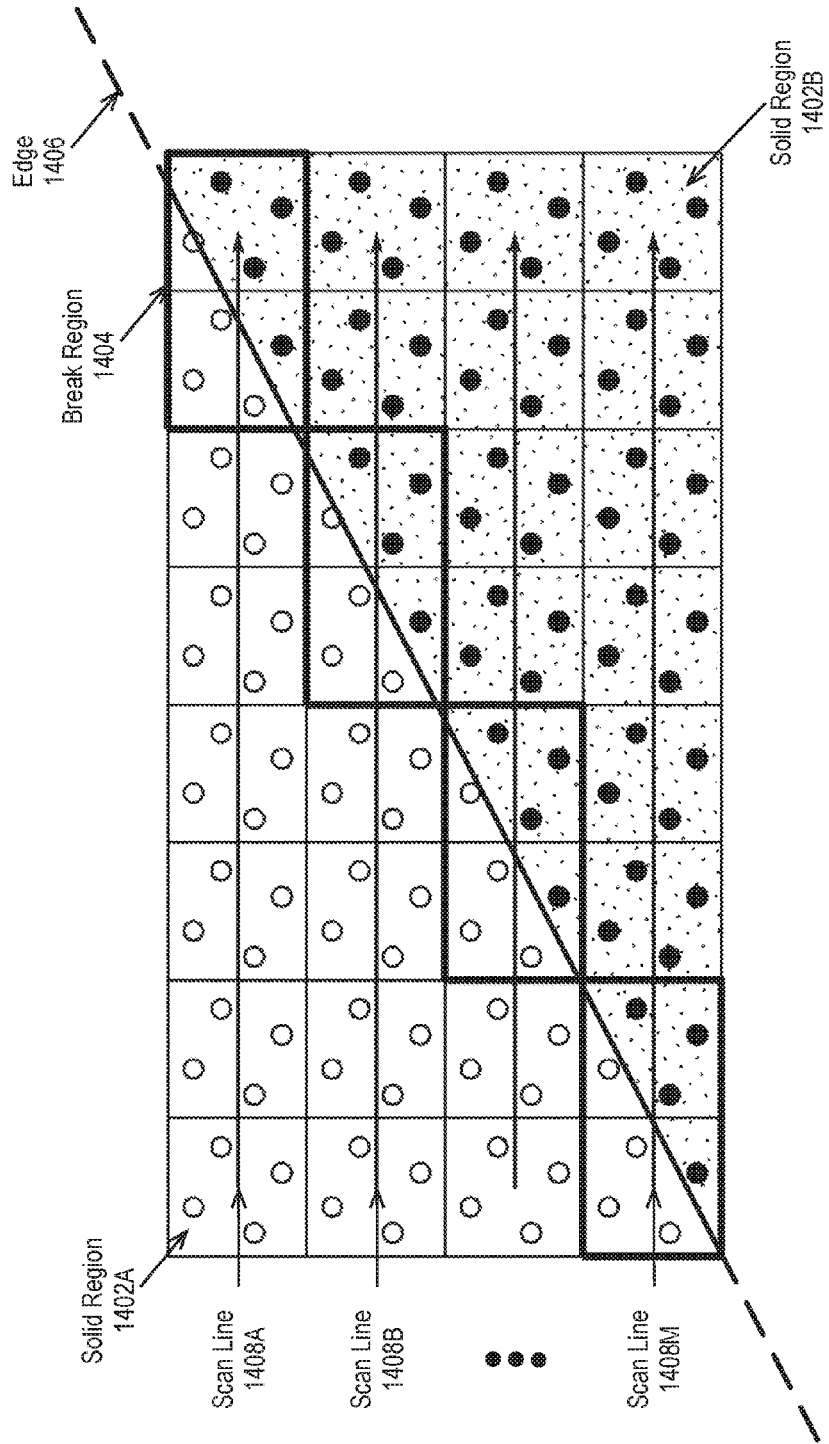
FIG. 14 is an illustration of the operation of an algorithm to compact a representation of a partial coverage or depth layer mask, according to an embodiment.

FIG. 14 is an illustration of the operation of an algorithm to compact a representation of a partial coverage or depth layer mask, according to an embodiment. An 8×4 pixel tile is illustrated. 4×MSAA is enabled, given four samples per pixel. Each pixel-row in the tile includes contiguous regions of pixels that are, for example, either fully covered or fully not covered, or associate with one depth layer or another. Such regions may be referred to as solid regions 1402A-B. A mask for a solid region may be stored using only one bit indicating that the solid region is covered or uncovered, or, in the example of two depth layers, is associated with depth layer zero or depth layer 1. For example, solid region 1402A may represent an uncovered region of pixels, while solid region 1402B may represent a covered region of pixels.

A break region (e.g., break region 1404) separates each solid region. A break region is a region where a bit is stored for each sample to indicate a characteristic for the sample, such as whether the sample is covered or the depth layer associated with the sample. After each break, an additional bit is stored to indicate a characteristic for the following solid region (e.g., covered/uncovered, depth layer, etc.). In general, the break regions will lie along a triangle edge 1406 that intersects a given region of pixels. A two-pixel break region 1404 is illustrated in FIG. 14, with each pixel having four sample points, for a total of eight sample points to encode per scan line.

In one embodiment the process of identifying solid regions and break regions may be implemented determining the value of a search characteristic (e.g., coverage, mask, depth layer) of the first sample in the first pixel in the region. Then the sequence can then scan over all samples in all pixels, for example from left to right within each scan line 1408A-M. Once a sample with a characteristic that differs from the initial characteristic is found, the enclosing pixel is marked as a break. An explicit mask is stored for all samples in all pixels within the break region, which can extend over a number of pixels.

After explicitly storing characteristic mask bits for all samples in all pixels in the break region, the search characteristic is reinitialized to be the relevant characteristic mask bit of the first sample in the first pixel after the break region, followed by an iterative search for the next break. Typically the location (e.g., horizontal or vertical coordinate, depending on the scan method) for each break point along scan line is encoded as a binary value. In such algorithms, for N possible values along M scanlines, $M \times \lceil \log_2 N \rceil$ bits can be used to store the set of breakpoints.

For example, for horizontal scanning along an 8×4 pixel tile using a one pixel break point, a break point may begin at any one of eight pixels along a scanline. In such example, M=4 scanlines and N=8 possible horizontal points along the scan line, resulting in a bit count of three bits per scanline, for a total of 12 bits per tile to encode the location of the breakpoint for each line.

However, in the case of an edge crossing a tile, the breakpoint coordinates may be assumed to be increasing or decreasing for each scan line. In the example of FIG. 14, the break point coordinates lie in a decreasing sequence across scan lines 1408A-M. Embodiments of the graphics processing logic described herein can be used to optimize the number of bits used to encode breakpoint positions, or other pixel data and/or metadata, by assuming the values will be increasing or decreasing during a scan. Given breakpoints $b_i$, it can be assumed that $\{b_i \leq b_{i+1} | \forall i\}$ or $\{b_i \geq b_{i+1} | \forall i\}$. In general, this assumption holds for most cases that are subject to break point encoding, and can be safely made for cases in which a single edge crosses a tile, as illustrated in FIG. 14. Although FIG. 14 is described and illustrated with respect to row based scan lines, one having ordinary skill in the art will understand that column based scan lines may also be used.

By assuming increasing or decreasing values, it becomes possible to encode the break points using fewer bits than a straightforward binary encoding. Given the example of N possible break points along M scan lines, the breakpoints can be encoded using a number of bits determine by equation 1 below:

$$\left\lceil \log_2 \left( 2 \times \sum_{i_0=0}^{N-1} \sum_{i_1=i_0}^{N-1} \cdots \sum_{i_{M-1}=i_{M-2}}^{N-1} 1 \right) \right\rceil \quad \text{Equation 1}$$

Accordingly, number of bits used to encode the breakpoints will be less than a straightforward bit encoding approach.

The pixel data processing techniques described herein include enumerating all unique combinations of increasing values and assigning an index to each such combination. The index can then be encoded into a compressed representation of the pixel data. Assuming known and constant values for N and M described above, which are tied to size of a memory tile within the system a set of compact lookup tables can be computed to encode or decode a set of break points. Decreasing values can be handled through symmetry by reversing the order of all break points.

This solution provides benefit over alternative approaches that, for example, encode all possible sample patterns that may arise from an edge crossing a tile, in that assuming increasing or decreasing values is an algorithmically simpler approach that may be efficiently implemented in hardware.

For this description it will be assumed that a group of M break points exists, where each break point is represented as a single index. A common use case would be to set M to the number of scan lines in a tile, but it may also be beneficial to group fewer values together to balance storage size and computational cost. Each break point may assume one of N different values. Only the case of increasing brake points are considered below, as decreasing break points may be handled symmetrically by reversing the order of the break points.

The encoding process is described below. During a pre-compute stage, a lookup table is generated for each break point containing an index offset for all break point configurations occurring "less than" the current break point. Our ordering for the breakpoints is implicitly specified by the equation below, and can be analogized to the ordering of digits within an ordinary number. Given break point values, breakpoint [i], each value can be viewed as a digit in a number, with breakpoint [0] being the most significant digit, and breakpoint [M−1] being least significant. A value (configuration) can be said to occur before another configuration if the most significant digit that differs is greater (e.g., reverse ordering). However, one skilled in the art will recognize that other ordering methods may also be used.

Given the arrangement described above, a precomputed lookup table can be by Equation 2 below.

$$\text{offsetLUT}[m][n] = \sum_{i_m=n}^{N-1} \sum_{i_{m+1}=i_m}^{N-1} \cdots \sum_{i_{M-1}=i_{M-2}}^{N-1} 1 \quad \text{Equation 2}$$

Using the precompiled lookup table, a unique index may be computed from a set of break points as shown in Equation 3 below.

$$\text{index} = \sum_{i=0}^{M-1} \text{offsetLUT}[i][\text{breakpoint}[i]] \quad \text{Equation 3}$$

Similarly, break points are decoded using a precomputed look up table, where each unique index is associated with the configuration of break points that may generate. Graphics processing logic can iterate over all valid configurations of breakpoints and use the previously computed lookup table to compute the unique index for each configuration according to Equation 1 above. Given the index, the inverse lookup table for computing the breakpoints may be initialized from the original configuration using Equation 4.

breakpointLUT[$m$][index]=breakpoint[$m$]  Equation 4

Once the inverse lookup table has been constructed, the set of break points can be retrieved from an encoded index by performing a table lookup via Equation 5.

breakpoint[$m$]=breakpointLUT[$m$][index]  Equation 5

It should be noted that while the algorithm appears to be computationally expensive, the number of break points M and number of available break point values N are typically system constants that typically depend on tile sizes and specific formats used to encode color or depth data in the pipeline. Therefore, it's possible to encode the precompute steps into hardware logic, enabling the lookup tables to be defined directly as hardware circuitry. Thus, in one embodiment, only Equation 3 and 5 are performed during runtime.

While the logic is described with respect to break point encoding for pixel depth or coverage values, the logic can be generalized for any set of increasing or decreasing values. For example if graphics processing logic is to encode three increasing numbers defined as nbr[0], nbr[1], nbr[2], where each number can assume one of four different values: 0, 1, 2, or 3, a naïve encoding algorithm would use three 2-bit values, for a total of six bits. However, if the values are known to be increasing, the amount of storage used to encode the values can be reduced. For example, assume nbr[0]=nbr[1]=0, and assuming the set of values is an increasing sequence, all valid values of nbr[2] are shown in Table 1 below.

TABLE 1

Valid nbr[2] values assuming an increasing sequence from 0, 0, x

| nbr[0] | nbr[1] | nbr[2] |
|---|---|---|
| 0 | 0 | 0 |
| 0 | 0 | 1 |
| 0 | 0 | 2 |
| 0 | 0 | 3 |

Assuming nbr[0]=0 and nbr[1]=1. The possible combinations are enumerated in Table 2 below.

TABLE 2

Valid nbr[2] values assuming an increasing sequence from 0, 1, x

| nbr[0] | nbr[1] | nbr[2] |
|---|---|---|
| 0 | 1 | 1 |
| 0 | 1 | 2 |
| 0 | 1 | 3 |

Note that 0,1,0 is not a valid combination of values and is not shown in Table 2, as the value is not an increasing sequence of values given the assumed baseline of 0,1,x. For the three numbers nbr[0], nbr[1], and nbr[2], an enumeration of valid values can be defined in reversed order and assigned a unique index for each combination, as shown in Table 3 below.

TABLE 3

Enumerated configurations for nbr[0, 1, 2] with reverse order index 3, 3, 3 → 0
2, 3, 3 → 1    2, 2, 3 → 2
               2, 2, 2 → 3
1, 3, 3 → 4    1, 2, 3 → 5    1, 1, 3 → 7
               1, 2, 2 → 6    1, 1, 2 → 8
                              1, 1, 1 → 9
0, 0, 3 → 10   0, 2, 3 → 11   0, 1, 3 → 13   0, 0, 3 → 16
               0, 2, 2 → 12   0, 1, 2 → 14   0, 0, 2 → 17
                              0, 1, 1 → 15   0, 0, 1 → 18
                                             0, 0, 0 → 19

Table 3 shows all valid configurations for nbr[0,1,2], in reversed order, each combination having a unique index. The 19 combinations can be indexed using five bits instead of the 6 bits of the straightforward binary encoding. Each configuration can be read as a three-digit value, and larger values will have lower indices. For example 223 has an index of 2, which is a lower index than 112, with an index of 5. The specific order used to enumerate the combinations shown in Table 3 is exemplary and other orders may be used.

Using the ordering of Table 3, index computation can be generalized for nbr[0,1,2] as shown in Equation 6.

$$\text{index} = \sum_{i=nbr[0]}^{3}\sum_{j=i}^{3}\sum_{k=j}^{3}1 + \sum_{j=nbr[1]}^{3}\sum_{k=j}^{3}1 + \sum_{k=nbr[2]}^{3}1 \quad \text{Equation 6}$$

Computing the LUT

The index equation shown in Equation 6, for the example of nbr[0,1,2] demonstrates that the index can be computed as the sum of three independent functions.

$$\text{index} = f_0(nbr[0]) + f_0(nbr[1]) + f_0(nbr[2]) \quad \text{Equation 7}$$

$$f_0(nbr[0]) = \sum_{i=nbr[0]}^{3}\sum_{j=i}^{3}\sum_{k=j}^{3}1 \quad \text{Equation 8}$$

$$f_1(nbr[1]) = \sum_{j=nbr[1]}^{3}\sum_{k=j}^{3}1 \quad \text{Equation 9}$$

$$f_2(nbr[2]) = \sum_{k=nbr[2]}^{3}1 \quad \text{Equation 10}$$

Each of these functions can be pre-computed and stored in a lookup table. Given M numbers (nbr[0, . . . , M−1]), where each number can assume N values (0 . . . N−1), the graphics logic can pre-compute the lookup table of Table 4 below using Equation 2 above.

TABLE 4

OffsetLUT for Enumerated Configurations of Table 3

| offsetLUT[m][n] | n = 0 | n = 1 | n = 2 | n = 3 |
|---|---|---|---|---|
| m = 0 | 10 | 4 | 1 | 0 |
| m = 1 | 6 | 3 | 1 | 0 |
| m = 2 | 3 | 2 | 1 | 0 |

The index of configuration "1,1,2", for example, can then be computed as Equation 11 below.

index=offsetLUT[$m$=0][$n$=1]+offsetLUT[$m$=1]
[$n$=1]+offsetLUT[$m$=2][$n$=2]=4+3+1=8  Equation 11

The index can be confirmed with reference to Table 3 above. In the example of breakpoint encoding, the value 1,1,2 could represent coordinates for three breakpoints associated with three sequential scan lines, and a single index can be encoded in place of a separate encoding for the break coordinate within each scan line.

Given the equations provided herein, a lookup table may be computed using the logic shown in Code 1 below.

Code 1: Lookup Table Computation Logic

```
int computeIndex(int m, int n)
{
    if (m == M-1)
        return N-1-n;
    else
        int sum = 0;
        for (int i = n; i < N-1; ++i)
            sum += computeIndex(m+1, i);
        return sum;
}
int computeOffsetLUT( )
{
    for (int m = 0; m < M; ++m)
        for (int n = 0; n < N; ++n)
            offsetLUT[m][n] = computeIndex(m, n);
}
```

In one embodiment the computation logic of Code 1 can be designed into the circuitry of the graphics processor, enabling computation to be performed in hardware based on known use cases. For example, in the case of break point encoding as described above, the specific number of break points and the number of possible values for each break point may be hardware system constraint. For example, it may be known that M=4 break points will be encoded, where each break point can assume one of N=9 values. These known values can be used to design pre-compute hardware that can rapidly pre-generate the lookup tables.

Increasing Value Encoding Logic

For the general case, where the offsetLUT has been computed, a value in which each digit is increases can be encoded as in Equation 12, which is a generic form of Equation 3.

$$\text{index} = \sum_{i=0}^{M-1} \text{offsetLUT}[i][\text{nbr}[i]] \quad \text{Equation 12}$$

Equation 12 can be implemented as shown by Code 2 below.

Code 2: Encoding Increasing Values

```
int encodeIncreasingValues(int nbr[ ])
{
    int index = 0;
    for (int i = 0; i < M; ++i) //M is the #numbers to encode
        index += offsetLUT[i][nbr[i]];
    return index;
}
```

The index returned from the logic above can then be encoded into the compressed data.

Increasing Value Decoding Logic

Decoding is essentially the inverse of the encoding process. A lookup table that is the inverse of the setup a lookup table that is the inverse of Table 3 can be created, where the decode lookup table converts from an index to, for example, numbers, nbr[0,1,2]. Given the encodeIncreasingValues function defined above, the lookup table used to decode a given index can be computed as shown by the logic shown in Code 3 below.

Code 3: Compute Decode LUT

```
int computeDecodeLUT( )
{
    for (int i_0 = 0; i_0 < N; ++i_0)
        for (int i_1 = i_0; i_1 < N; ++i_1)
            ...
            for (int i_M-1 = i_M-2; i_M-1 < N; ++i_M-1)
            //M loops in total
                index = encodeIncreasingValues([i_0,
                    i_1, ..., i_M-1])
                decodeLUT[0][index] = i_0
                decodeLUT[1][index] = i_1
                ...
                decodeLUT[M-1][index] = i_M-1
}
```

Given the lookup table above, a sequence of numbers cab be decoded from an index through a few table lookups, as shown by the logic of Code 4 below.

Code 4: Compute Decode LUT

```
void decodeIncreasingValues(output int nbr[ ], int index)
{
    for (int i = 0; i < M; ++i)
        nbr[i] = decodeLUT [i][index];
}
```

Figure 15:
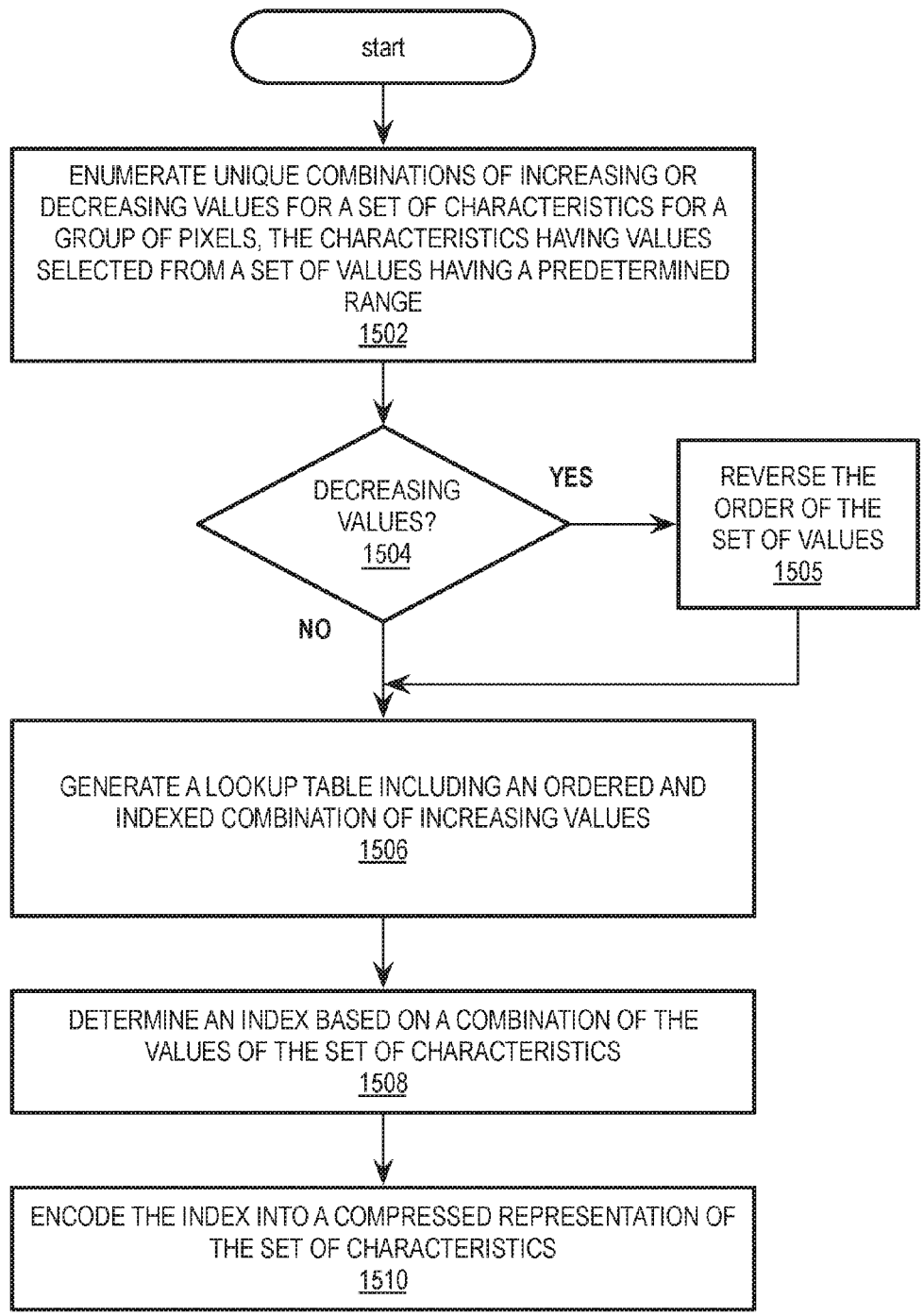
FIG. 15 is a flow diagram of generalized value encoding logic, according to embodiments described herein.

FIG. 15 is a flow diagram of generalized value encoding logic 1500, according to embodiments described herein. Embodiments of value encoding logic configure graphics processor logic to enumerate unique combinations of increasing or decreasing values for a set of characteristics for a group of pixel, the characteristics having values selected from a set of values having a predetermined range, as shown at block 1502. The unique combination of values, in one embodiment, is the unique combination of the locations of M breakpoints within a tile (e.g., for each one of M scan lines), where each breakpoint may have any one of N values between zero and N−1, and the breakpoint locations are increasing or decreasing across the scan lines. Decreasing order breakpoints are handled through symmetry by reversing the order of all break points and encoding the breakpoints as an increasing sequence. For example, as shown at 1504, in the instance of decreasing values (e.g., breakpoints, etc.) the value encoding logic 1500 can reverse the order of the set of values at block 1505. Embodiments are not limited to breakpoint encoding, however. The encoding techniques can be applied to any group of M pixel data characteristics (e.g., data or metadata) having one of N values, where the combination of numbers is sequentially increasing or decreasing.

At block 1506, the value encoding logic can generate a lookup table for configurations, where the index table includes an ordered and indexed combination of increasing sequential values. The lookup table generation at block 1506 can be performed during a setup period in advance of the initiation of graphics operations using graphics processing logic specifically configured to generate the lookup table based on known hardware characteristics and constraints. For any set of pixel data characteristics having a known number of data points having a known set of potential values, an offset lookup table can be pre-computed by graphics processing logic in accordance with Equation 2 or the logic of Code 1 above.

At block 1508 the value encoding logic 1500 can determine an index based on a combination of the values for the set of characteristics for the pixel data. For example, given values M=3 and N=4, a configuration of three characteristics having the values 1, 1, and 2 can be encoded into an index value of 8, as in Table 3 above. At block 1510, the generated index can be encoded into a compressed representation of the set of characteristics.

Figure 16:
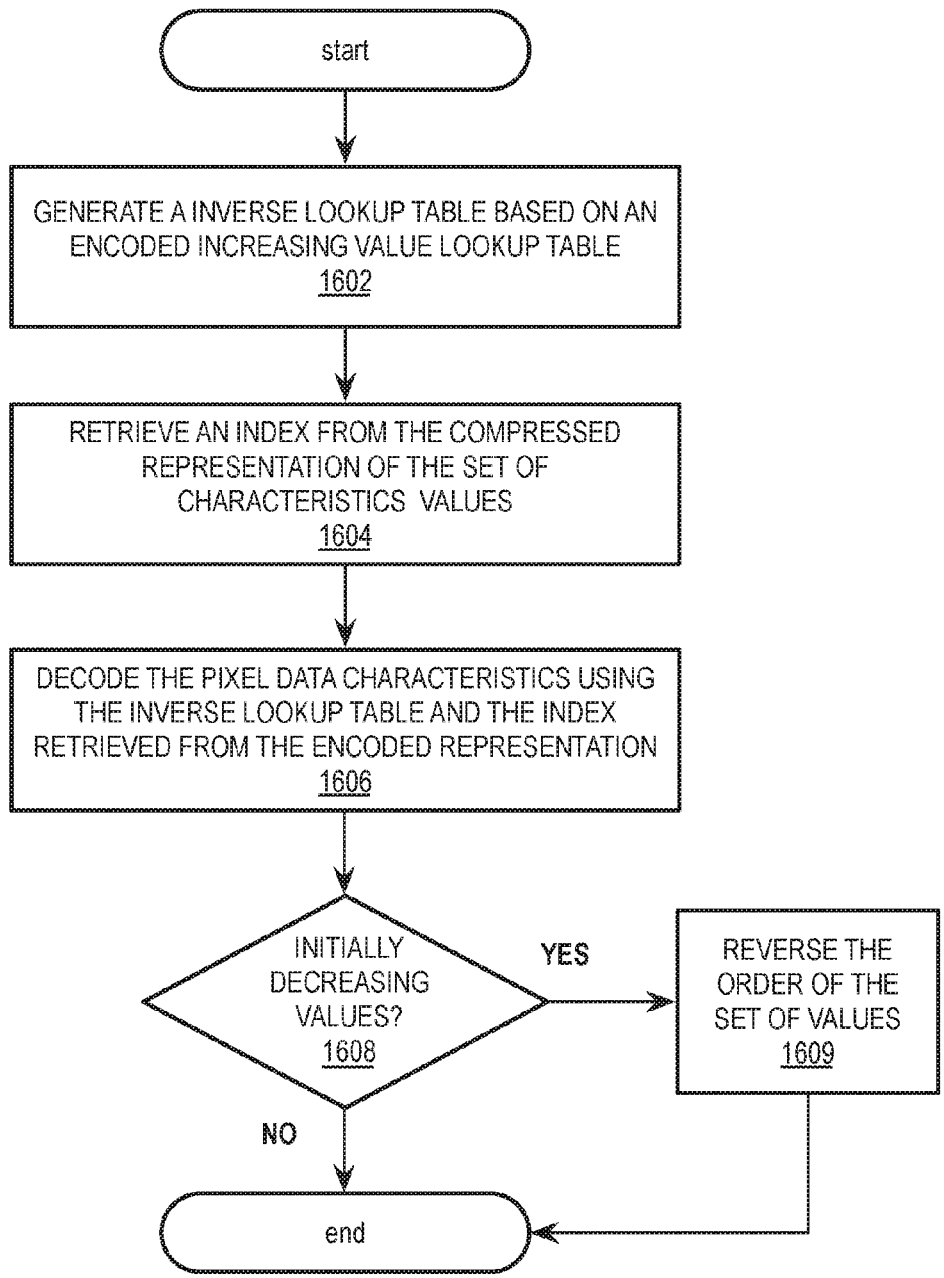
FIG. 16 is a flow diagram of generalized value decoding logic, according to embodiments described herein.

FIG. 16 is a flow diagram of generalized value decoding logic 1600, according to embodiments described herein. The value decoding logic 1600 can generate a inverse lookup table based on an encoded increasing value lookup table, as shown at block 1602. The inverse lookup table can be generated, in one embodiment, using the logic shown by Code 3 above. The value decoding logic 1600 can then retrieve an index from the encoded representation of the combined values, as shown at block 1604. The value decoding logic 1600 can then decode the pixel data characteristics from the encoded representation of the combined values, as shown at block 1606. In one embodiment, the encoded representation can represent a set pixel data characteristics (e.g., break point locations, sample values etc.) for a tile of pixels.

At 1608 the value decoding logic 1600 can determine whether the values were initially increasing or decreasing values. The value decoding logic 1600 can determine whether the values were initially increasing or decreasing, for example, based on the slope of the edge intersecting the tile, or via an additional bit stored with the data to indicate the ordering sequence. For initially decreasing values, at block 1609 the value decoding logic 1600 can reverse the order of the set of values to restore the originally decreasing order.

Figure 17:
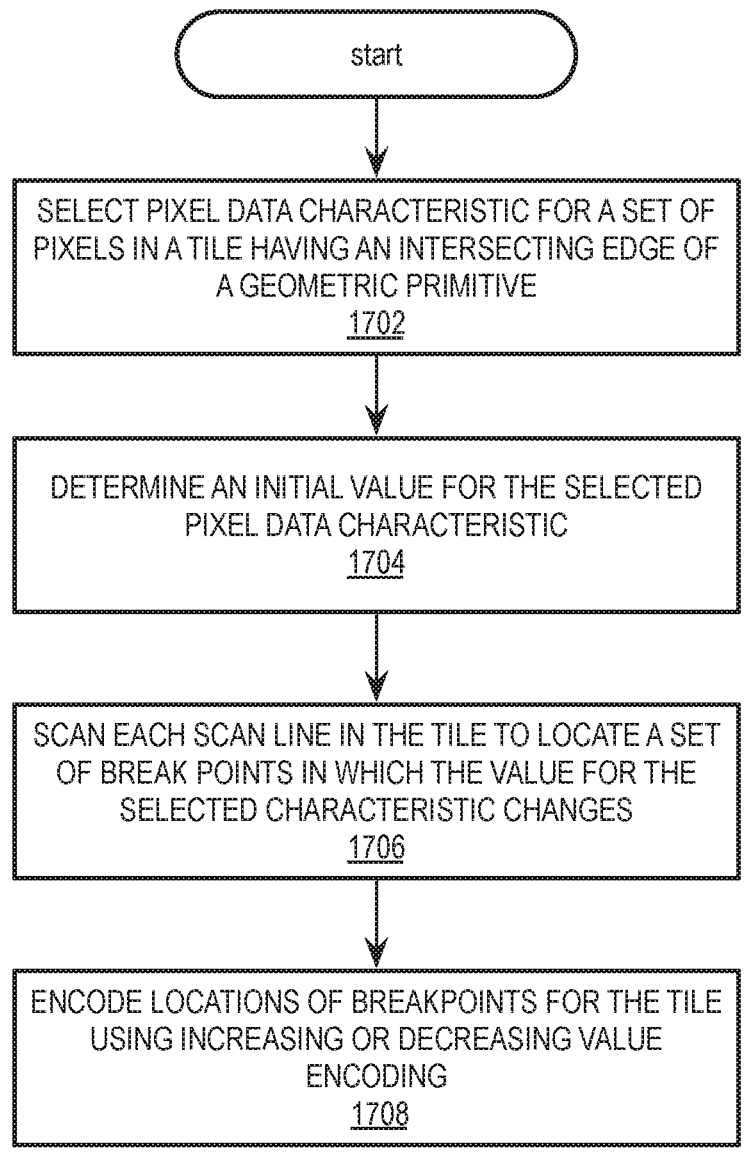
FIG. 17 is a flow diagram of pixel mask breakpoint encoding logic, according to embodiments described herein.

FIG. 17 is a flow diagram of pixel mask breakpoint encoding logic 1700, according to embodiments described herein. Generalized pixel mask break point/region encoding, for example, for break regions within coverage masks, depth layer masks, etc., is one of several possible applications for the encoding and decoding logic described herein. Within a break region, a per-sample mask is encoded for each sample within the region. In the example of an edge crossing a tile region, the start coordinates of the break regions can be assumed to be arranged in an increasing or decreasing manner across the tile. In some instances, the encoded values of the per-sample masks for each pixel may also follow an increasing or decreasing pattern.

At block 1702, the pixel mask breakpoint encoding logic 1700 of a graphics processor can select pixel data characteristic for a set of pixels in a tile having an intersecting edge of a geometric primitive (e.g., triangle), as shown at block 1702. The pixel characteristic can be any pixel characteristic (e.g., coverage, depth, etc.) in which per-sample characteristics are encoded within a break region between solid regions. The pixel mask breakpoint encoding logic 1700 can then determine an initial value for the selected pixel data characteristic at block 1704. The pixel mask breakpoint encoding logic 1700 can then scan each scan line in the tile to determine a location of a set of break points within the tile in which the value for the selected characteristic changes, as shown at block 1706. At block 1708, the pixel mask breakpoint encoding logic 1700 can encode the locations of the pixel breakpoints using increasing/decreasing value encoding. In some instances, the per-sample characteristics within the break region may also be encoded. The encoded representation can then be stored in memory on the graphics processor, such as a depth or render cache.

Figure 18:
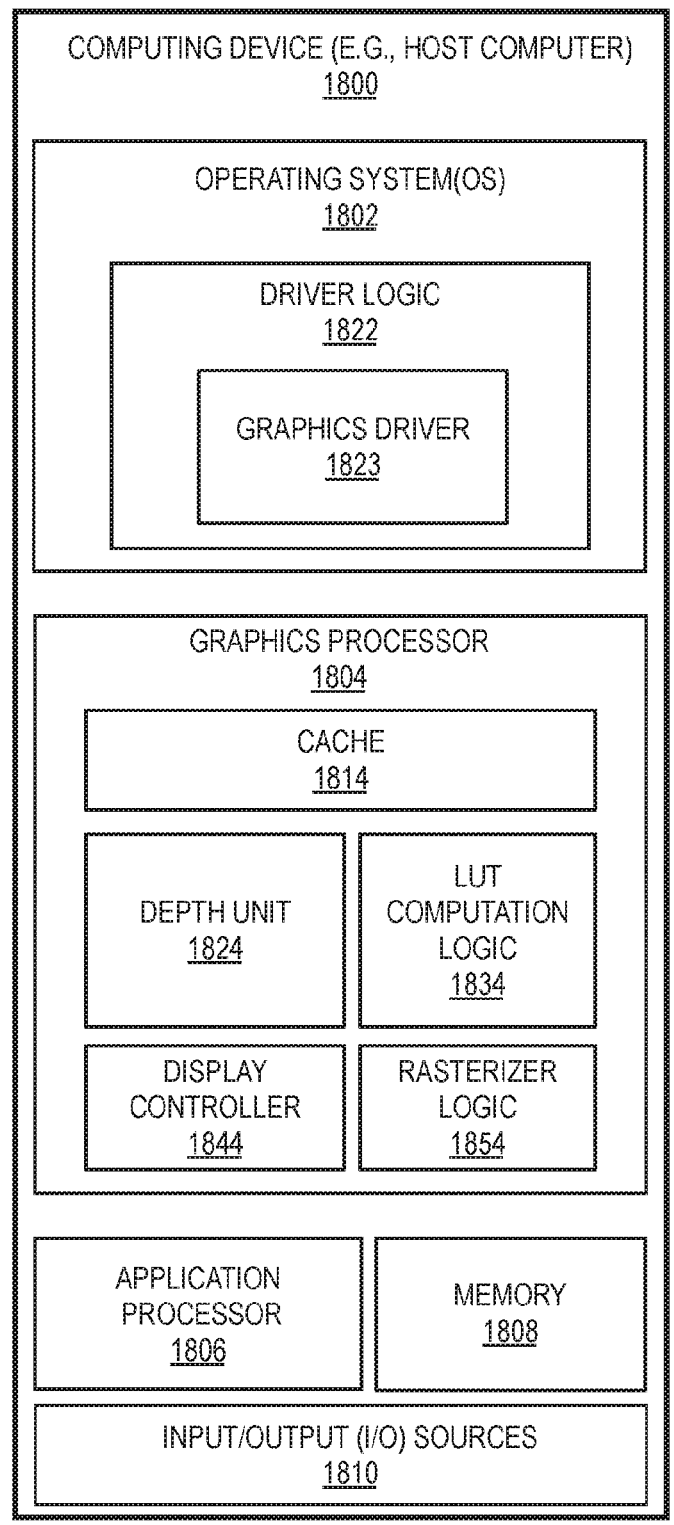
FIG. 18 is a block diagram of a computing device including a graphics processor having logic to optimize the encoding of increasing or decreasing values, according to an embodiment.

FIG. 18 is a block diagram of a computing device 1800 including a graphics processor 1804 having logic to optimize the encoding of increasing or decreasing values, according to an embodiment. The logic to optimize the encoding of increasing or decreasing values can be used, for example, to encode breakpoint or edge data associated with pixel data characteristics such as coverage masks, depth masks, or other pixel processing operations that are performed during pixel rendering and/or rasterization. The computing device 1800 can be a computing device such as the data processing system 100 as in of FIG. 1. The computing device 1800 may also be or be included within a communication device such as a set-top box (e.g., Internet-based cable television set-top boxes, etc.), global positioning system (GPS)-based devices, etc. The computing device 1800 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 1800 includes a mobile computing device employing an integrated circuit ("IC"), such as system on a chip ("SoC" or "SOC"), integrating various hardware and/or software components of computing device 1800 on a single chip.

The computing device 1800 includes a graphics processor 1804, which may be any of the graphics processors described herein. In one embodiment the graphics processor 1804 includes a cache 1814, a depth unit 1824, lookup table (LUT) computation logic 1834, a display controller 1844, and rasterizer logic 1855. The cache 1814 can be or include a render cache for use in performing rendering operations or a depth cache for use in performing depth testing and/or occlusion operations. In one embodiment, during rendering operations, encoded representations of pixel data characteristics for a tile may be stored in the cache 1814. In one embodiment, the cache 1814 can also include an additional level of the memory hierarchy, such as a last level cache stored in the embedded memory module 218 of FIG. 2. The display controller 1644 can be configured to display framebuffer memory via a display device. The display controller 1644 may be a variant of the display controller 302 of FIG. 3 and/or the display engine 840 of FIG. 4. The depth unit 1824 and rasterizer logic 1854 can be variants of the depth unit 1328 and rasterizer 1322 of FIG. 13.

In one embodiment the lookup table (LUT) computation logic 1824 is hardware logic configured to pre-compute lookup tables based on certain factors determined by hardware constraints of the graphics processor, such as the number of scan lines or possible break points within a tile or group of pixels stored in memory. Pixel data characteristic encoding and decoding as described herein can be performed within the depth unit 1824 based on precomputed lookup tables generated by the LUT computation logic 1834. In one embodiment the LUT computation logic 1824 can be substituted by compiler logic that pre-generates lookup tables and compile time, where the pre-generated lookup tables are loaded into graphics processor memory during initialization.

As illustrated, in one embodiment, in addition to a graphics processor 1804, the computing device 1800 may further include any number and type of hardware components and/or software components, such as (but not limited to) an application processor 1806, memory 1808, and input/output (I/O) sources 1810. The application processor 1806 can interact with a hardware graphics pipeline, as illustrated with reference to FIG. 3, to share graphics pipeline functionality. Processed data is stored in a buffer in the hardware graphics pipeline, and state information is stored in memory 1808. The resulting image is then transferred to the display controller 1844 for output via a display device, such as the display device 320 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

The application processor 1806 can include one or processors, such as processor(s) 102 of FIG. 1, and may be the central processing unit (CPU) that is used at least in part to execute an operating system (OS) 1802 for the computing device 1800. The OS 1802 can serve as an interface between hardware and/or physical resources of the computer device 1800 and a user. The OS 1802 can include driver logic 1822 for various hardware devices in the computing system 1800. The driver logic 1822 can include graphics driver logic 1823 such as the user mode graphics driver 1026 and/or kernel mode graphics driver 1029 of FIG. 10. In one embodiment the graphics driver logic 1823 can be used to generally configure components of the graphics processor 1804. In one embodiment, the graphics driver 1823 is responsible for loading lookup tables into graphics processor memory that may be generated by compile time LUT computation logic.

It is contemplated that in some embodiments, the graphics processor 1804 may exist as part of the application processor 1806 (such as part of a physical CPU package) in which case, at least a portion of the memory 1808 may be shared by the application processor 1806 and graphics processor 1804, although at least a portion of the memory 1808 may be exclusive to the graphics processor 1804, or the graphics processor 1804 may have a separate store of memory. The memory 1808 may comprise a pre-allocated region of a buffer (e.g., framebuffer); however, it should be understood by one of ordinary skill in the art that the embodiments are not so limited, and that any memory accessible to the lower graphics pipeline may be used. The memory 1808 may include various forms of random access memory (RAM) (e.g., SDRAM, SRAM, etc.) comprising an application that makes use of the graphics processor 1804 to render a desktop or 3D graphics scene. A memory controller hub, such as memory controller hub 116 of FIG. 1, may access data in the memory 1808 and forward it to graphics processor 1804 for graphics pipeline processing. The memory 1808 may be made available to other components within the computing device 1800. For example, any data (e.g., input graphics data) received from various I/O sources 1810 of the computing device 1800 can be temporarily queued into memory 1808 prior to their being operated upon by one or more processor(s) (e.g., application processor 1806) in the implementation of a software program or application. Similarly, data that a software program determines should be sent from the computing device 1800 to an outside entity through one of the computing system interfaces, or stored into an internal storage element, is often temporarily queued in memory 1808 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2010 may include one or more I/O devices that are implemented for transferring data to and/or from the computing device 1800 (e.g., a networking adapter); or, for a large-scale non-volatile storage within the computing device 1800 (e.g., hard disk drive). User input devices, including alphanumeric and other keys, may be used to communicate information and command selections to graphics processor 1804. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 1800 may be employed to observe gestures, record audio and video and to receive and transmit visual and audio commands.

I/O sources 1810 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 1800 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing apparatus comprising:
a graphics processor including lookup table computation logic to generate a lookup table for a set of coordinates of a set of pixels defining break points across pixel data characteristics of a group of pixels, the lookup table including an ordered and indexed combination of pixel coordinates having increasing sequential values for the set of pixels defining the breakpoints.

2. The graphics processing apparatus as in claim 1 additionally including encode logic to determine an index for the set of pixel coordinates based on the lookup table and encode a compressed representation of the pixel coordinates for the set of pixels within the group of pixels using the index.

3. The graphics processing apparatus as in claim 2, wherein the pixel coordinates include a set of break point locations defining an edge or break region between solid regions within the group of pixels.

4. The graphics processing apparatus as in claim 2, wherein the pixel data characteristics include a per-sample coverage mask within the group of pixels.

5. The graphics processing apparatus as in claim 2, wherein the pixel data characteristics include a per-sample depth mask within the group of pixels.

6. The graphics processing apparatus as in claim 2, wherein the graphics processing apparatus is to store a compressed representation of the increasing sequential values of the coordinates of the set of pixels defining the breakpoints for the group of pixels in cache memory within the graphics processor.

7. The graphics processing apparatus as in claim 2 additionally including a depth unit, wherein a compressed representation of the increasing sequential values of the coordinates of the set of pixels defining the breakpoints for the group of pixels is stored at least temporarily in cache memory of the depth unit.

8. The graphics processing apparatus as in claim 2, wherein the encode logic is to detect the set of pixel coordinates having decreasing sequential values and reverse order the values of the set of pixel coordinates before determining the index for the set of pixel coordinates.

9. The graphic processing apparatus as in claim 1, wherein encode logic includes a pre-generated lookup table for the set of pixel coordinates based on a dimension of the group of pixels.

10. The graphic processing apparatus as in claim 1, wherein the lookup table computation logic is additionally configured to generate an inverse lookup table for the set of pixel coordinates for the group of pixels.

11. The graphic processing apparatus as in claim 10, further comprising decode logic to retrieve an index from a compressed representation of the set of coordinates of the set of pixels defining the breakpoints for the group of pixels and decode the pixel data characteristics using the inverse lookup table and the index retrieved from the compressed representation.

12. The graphic processing apparatus as in claim 11, wherein the decode logic includes a pre-generated inverse lookup table for the set of pixel coordinates based on a dimension of the group of pixels.

13. The graphics processing apparatus as in claim 11, wherein the decode logic is to determine if the set of pixel coordinates has initially decreasing sequential values and reverse order the values of the set of pixel coordinates.

14. A method of encoding values of pixel coordinates in a graphics processor, the method comprising:
enumerating a unique combination of increasing or decreasing values for a set of coordinates of a set of pixels defining break points within a group of pixels, the coordinates having values selected from a set of values having a predetermined range;
determining an index into a lookup table based on a combination of the values of the set of coordinates; and
encode the index into a compressed representation of the set of coordinates of the set of pixels.

15. The method as in claim 14, wherein the group of pixels is a tiled region of pixels, the predetermined range is based on a size of a dimension of the tiled region of pixels, and additionally comprising pre-generating the lookup table based on the size of the tiled region of pixels in multiple dimensions.

* * * * *